Patented May 5, 1925.

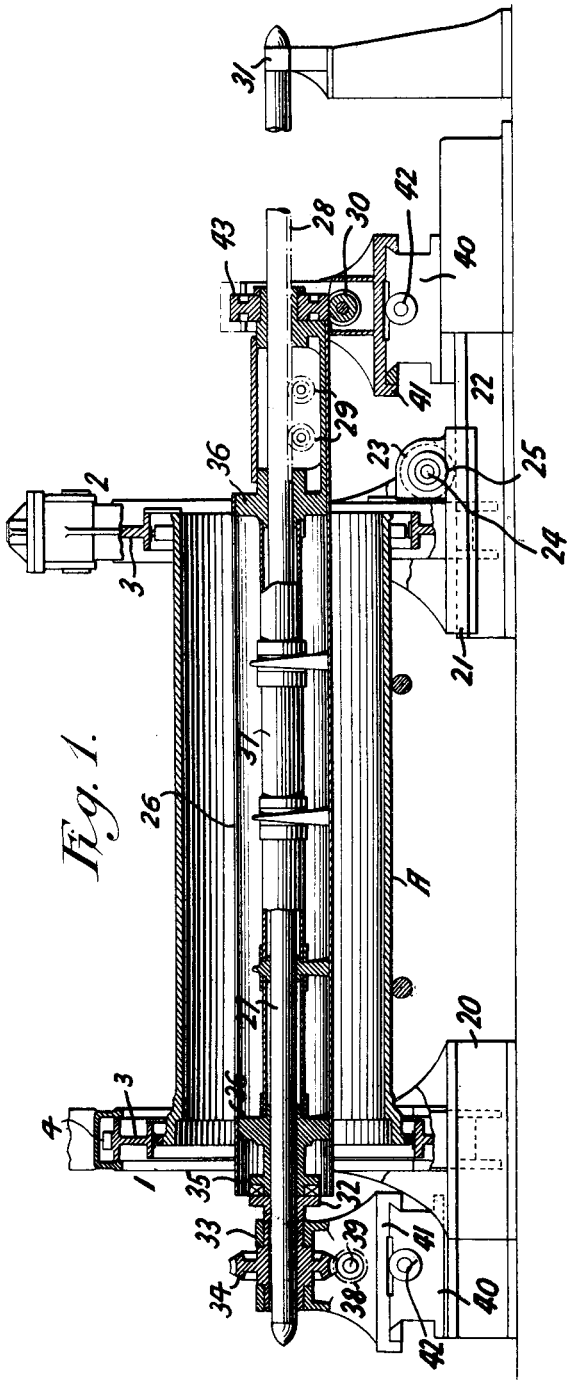

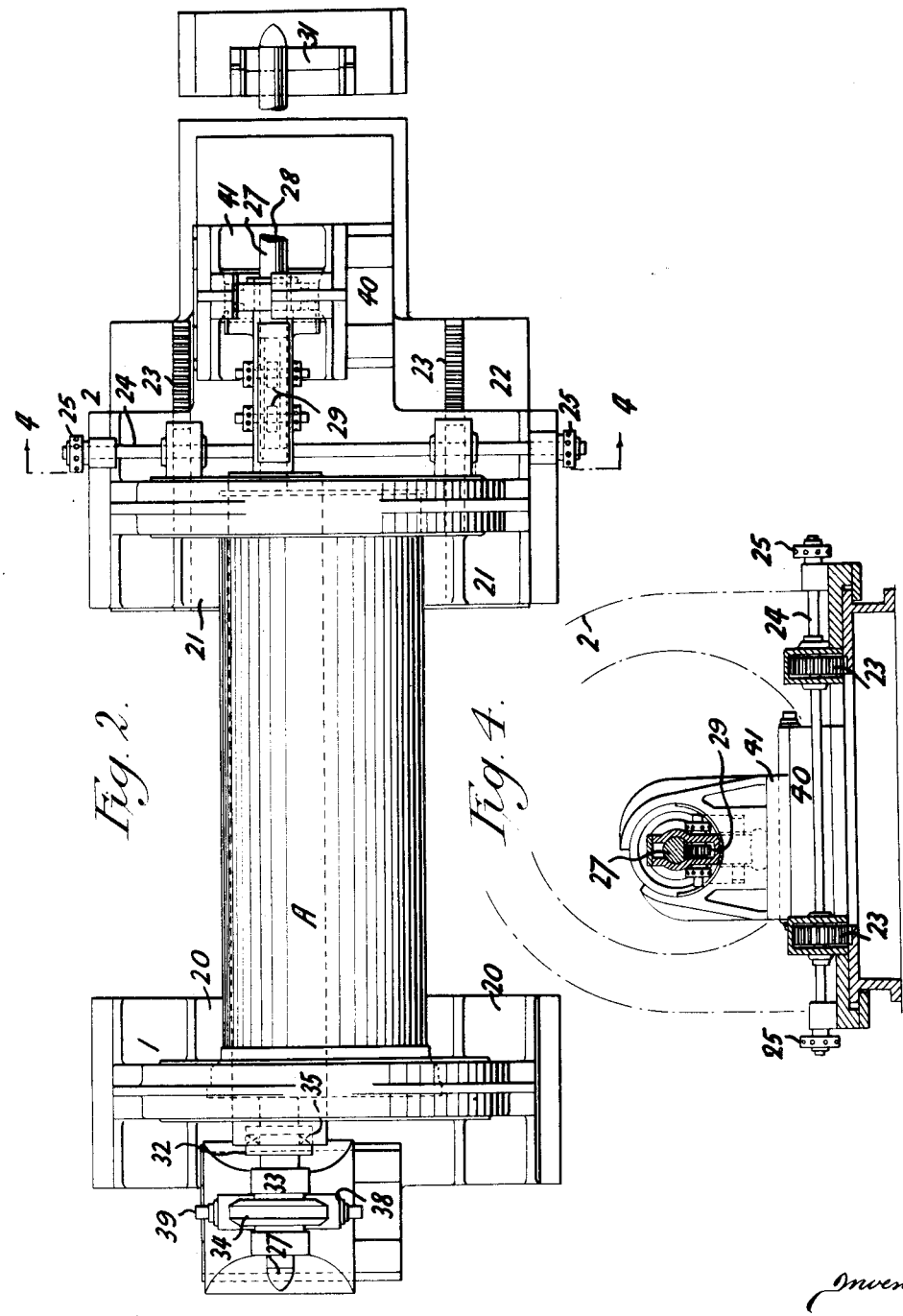

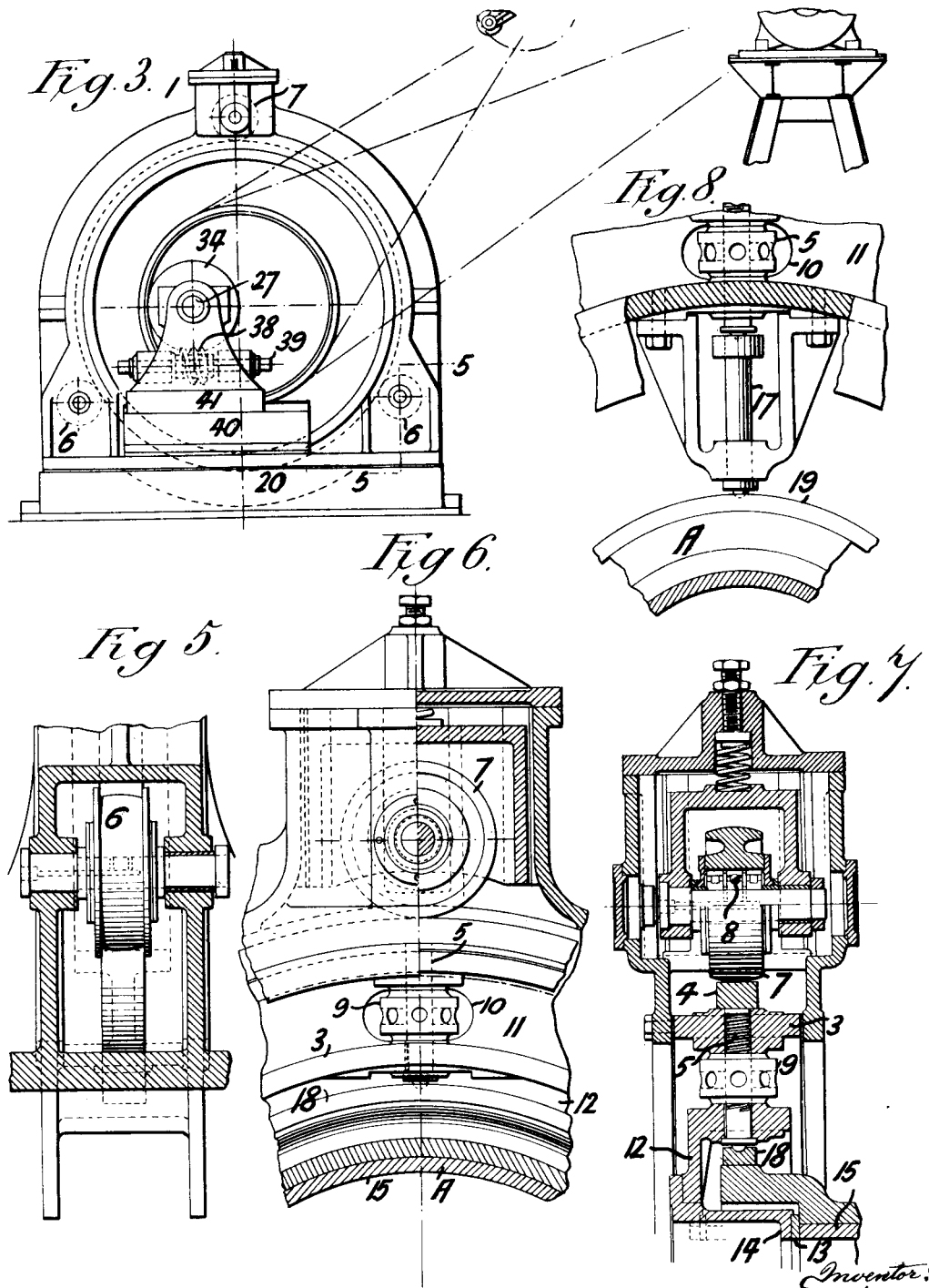

1,536,682

UNITED STATES PATENT OFFICE.

DONALD MOIR AND HUGH BUCHANAN, OF ROSARIO DE SANTA FE, ARGENTINA.

MEANS FOR THE LINING OR MANUFACTURE, CENTRIFUGALLY, OF PIPES, COLUMNS, AND OTHER HOLLOW ARTICLES.

Application filed October 13, 1923. Serial No. 668,320½.

*To all whom it may concern:*

Be it known that we, DONALD MOIR and HUGH BUCHANAN, both subjects of the King of Great Britain and Ireland, residing, respectively, at Rosario de Santa Fe, Argentine Republic, have invented Improvements in or Relating to Means for the Lining or Manufacture, Centrifugally, of Pipes, Columns, and Other Hollow Articles, of which the following is a specification.

The object of the present invention is to provide improved means for lining or manufacturing, centrifugally, pipes and other hollow articles, making use of initially plastic material in a manner equivalent to that described in the specification of British Letters Patent No. 12928 of 1915, it being specially intended to facilitate the production of articles of large diameter.

Said improved means are illustrated in the accompanying drawings whereof Fig. 1 is a part sectional elevation and Fig. 2 a plan of the principal members thereof. Fig. 3 is an end elevation looking at Fig. 1 from the left. Fig. 4 is a similar view of parts at the right hand end of the machine assuming a section on the line 4—4 of Fig. 2. Fig. 5 is a section, to a larger scale, on the line 5—5 of Fig. 3. Fig. 6 is a view to a larger scale of a part of Fig. 3 showing details not shown in said figure. Fig. 7 is a cross section corresponding thereto. Fig. 8 is a view similar to Fig. 6 with a portion broken away showing further details.

As shown in the said figures, the invention includes the provision of a stationary and a longitudinally movable roller-equipped housing lettered respectively 1 and 2, each containing a chuck ring 3 of say metal such as cast iron encircled and strengthened by a hoop 4 of steel. The said chuck rings 3 are fitted with three or more radially arranged pinching screws 5 to enable the pipe A or other article or the mould thereof to be clamped centrally in a secure manner. The chuck rings 3 may conveniently be of I shape in cross section, the hoop 4 serving as a tyre to run upon supporting rollers of which there may be three, two numbered 6 located towards the lower end of the apparatus and the third numbered 7 for steadying purposes and spring loaded, disposed at the top. The lower rollers 6 may be flanged but in practice it will be found sufficient to employ only one flanged roller which is that shown in Fig. 5. All the rollers preferably have ball bearings such as 8 to reduce friction. The pinching screws 5 may conveniently be operated by nuts 9 held against axial movement by being housed in openings 10 in the web 11 of the chuck ring. Each chuck ring may have an inwardly extending flange 12 or a series of brackets to enable the usual annular or any suitable members such as the rings 13 and 14 to be secured thereto to limit the thickness of the lining 15.

If desired and as shown in Fig. 8 brackets may be bolted or otherwise secured to the inner periphery of each chuck ring 3 containing radially arranged sliding members 17 constituting extensions of the pinching screws 5 so that pipes or moulds of smaller diameter can be clamped thereby. In Figs. 6 and 7 the screws 5 are shown as impinging upon a split ring 18 encircling the faucet of the pipe A or mould and the sliding member 17 may similarly impinge upon a ring 19 upon the faucet of the smaller pipe or mould, Fig. 8.

The housing 1 for one chuck ring 3 is secured to a solid foundation 20 and the other housing 2 is mounted on a table 21 adapted to slide upon a bed 22 so as to enable the chuck rings to be separated to an extent sufficient to enable the pipe or mould to be placed in position and removed. The movement of the table 21 can be controlled by any suitable means such as a screw or rack and pinion arrangement 23, the pinions being mounted upon a shaft 24 operable from either end by heads 25 provided with say tommy holes.

As in the earlier patent referred to the lining or article-producing material is distributed from a trough 26 but the trough in accordance with the present invention is combined with a supporting shaft 27 part of which is adapted at one time to be housed therein and at another to be projected therefrom, so that assuming the trough to be full and ready to be advanced into the pipe or mould the shaft 27 is preliminarily projected and anchored at its previously free end after which the trough is moved therealong. In this way the trough is effectually borne by a stationary support during the whole time it is being advanced and retracted.

The shaft 27 may be formed with a rack 28 engaged by a pinion or pinions 29 carried by the trough, the arrangement being such that with the trough supported at the forward end upon a roller 30 and reacting at the rear against a stationary bracket 31 as shown in dotted lines in Fig. 1 turning of the pinions 29 or one thereof in suitable direction, in this case counter-clockwise, will cause the supporting shaft to be projected, this continuing until one half 32 of a dog clutch for example encounters a stationary abutment 33 beyond the furthermost chuck ring 3, at which time the shaft end will have entered and become keyed to a worm wheel 34, when the shaft can no longer be projected. If the shaft 27 be then prevented from returning, which can be done by any suitable locking device not shown, the trough 26 can be advanced by turning either rack pinion 29 in the opposite direction, this being continued until a companion dog clutch 35 upon the trough 26 engages the other clutch member 32 referred to.

The trough 26 has ends 36 connected by a tube system 37 through which the supporting shaft 27 freely works and when the clutch 32, 35 is complete the trough can be rotated to any desired extent to empty the contents and also to determine the position of a dressing blade or knife carried thereby, by turning the worm wheel 34 to the desired extent, it being understood that the shaft 27 is arranged eccentrically in relation to the apparatus. This turning of the worm wheel 34 may be done from either or each side of the apparatus by employing a worm 38 on a shaft 39 fitted with an appropriate handle or handles. If desired the position of the trough may be laterally adjusted by mounting the worm gear 34—39 at one end and the supporting means 30 at the other end upon the pedestals 40 of cross slides 41 capable of being shifted sideways by rack and pinion or like devices, 42 representing the handles of screw threaded shafts working in nuts on the slides 41 in known manner.

The trough 26 does not rest directly upon the roller 30 at the time when it is to be turned, which roller would impede said turning, but has an extension which is mounted to turn in a loose ring 43 resting upon the roller 30.

What we claim is:—

1. In means of the kind herein referred to a chuck ring, pinching screws projecting radially inwards from said chuck ring, brackets removably secured to the chuck ring and members arranged to slide in said brackets, said members constituting inward extensions of the pinching screws, for the purpose set forth.

2. Means of the kind herein referred to, comprising a hollow revoluble member, a material-distributing trough adapted to be advanced longitudinally into the said member and a support extending through the trough along which the latter can travel.

3. Means of the kind herein referred to, comprising a hollow revoluble member, a material distributing trough adapted to be advanced longitudinally into the said member, a shaft extending through the trough along which the latter can travel, means connecting the trough and shaft when the trough is fully advanced into the revoluble member and means whereby the shaft and trough can be rotated.

4. Means of the kind herein referred to, comprising a material-receiving trough, a shaft extending through said trough and movable longitudinally in relation thereto, gearing between the shaft and trough and means collectively supporting the trough and shaft, the said gearing being adapted, at an initial position, to project the shaft from the trough prior to movement of the latter in one direction and, after the trough has been moved so as to travel over the projected shaft portion, adapted to reverse the travel of the trough along said shaft portion and ultimately return the shaft to the initial position.

5. Means of the kind herein referred to, comprising a hollow revoluble member, a material-distributing trough adapted to be advanced longitudinally into the said member and means whereby said trough is laterally adjustable within the hollow member.

6. In means of the kind herein referred to, a shaft, a material-receiving trough mounted to slide on said shaft, means for rotating the trough, a roller support along which the trough can be moved, and a loose member in which the trough is rotatably mounted adapted to rest upon the roller support aforesaid when the trough is being rotated.

Signed at Rosario de Santa Fe by DONALD MOIR this 21st day of August 1923.

DONALD MOIR.

Signed at Glasgow, Scotland by HUGH BUCHANAN this 14th day of June 1923.

BUCHANAN, HUGH.